US009422836B2

(12) United States Patent
Takahashi

(10) Patent No.: US 9,422,836 B2
(45) Date of Patent: Aug. 23, 2016

(54) VALVE TIMING CONTROL APPARATUS

(71) Applicant: DENSO CORPORATION, Kariya, Aichi-pref. (JP)

(72) Inventor: Hiroki Takahashi, Okazaki (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 14/800,862

(22) Filed: Jul. 16, 2015

(65) Prior Publication Data

US 2016/0024977 A1    Jan. 28, 2016

(30) Foreign Application Priority Data

Jul. 22, 2014  (JP) ................................. 2014-148561

(51) Int. Cl.
*F01L 1/34* (2006.01)
*F16H 1/32* (2006.01)
*F01L 1/352* (2006.01)

(52) U.S. Cl.
CPC . *F01L 1/34* (2013.01); *F01L 1/352* (2013.01); *F16H 1/32* (2013.01); *F01L 2103/00* (2013.01); *F01L 2250/02* (2013.01); *F01L 2810/04* (2013.01)

(58) Field of Classification Search
CPC ......... F01L 1/34; F01L 1/352; F01L 2103/00; F01L 2250/02

USPC .............................. 123/90.15, 90.17; 464/160
See application file for complete search history.

(56) References Cited

U.S. PATENT DOCUMENTS 7,377,242 B2 *   5/2008  Uehama ................. F01L 1/022
                                                  123/90.17
2009/0199801 A1   8/2009  Imai et al.

FOREIGN PATENT DOCUMENTS

JP           2009-185786       8/2009

* cited by examiner

*Primary Examiner* — Ching Chang
(74) *Attorney, Agent, or Firm* — Nixon & Vanderhye PC

(57) ABSTRACT

Bolts are respectively inserted through through-holes of a sun gear and are respectively threadably inserted into threaded holes of a driving-side rotatable body. The bolts are placed on an outer side of a first internally toothed portion of the sun gear in a radial direction and fix the sun gear and the driving-side rotatable body together. The sun gear includes press-fitting parts, each of which is press-fitted to a corresponding one of press-fitting projections of the driving-side rotatable body at a corresponding location that is located between corresponding adjacent two of the bolts in a circumferential direction, and open parts, each of which is placed at a corresponding location that overlaps with a corresponding one of the bolts in the circumferential direction, while a corresponding predetermined space is located adjacent to each of the open parts on an outer side of the open part in the radial direction.

4 Claims, 4 Drawing Sheets

VALVE TIMING CONTROL APPARATUS

CROSS REFERENCE TO RELATED APPLICATION

This application is based on and incorporates herein by reference Japanese Patent Application No. 2014-148561 filed on Jul. 22, 2014.

TECHNICAL FIELD

The present disclosure relates to a valve timing control apparatus.

BACKGROUND

Previously, there is known a valve timing control apparatus that adjusts valve timing of valves, which are opened and closed by a camshaft, by rotating a driven-side rotatable body, which is rotated synchronously with the camshaft, relative to a driving-side rotatable body, which is rotated synchronously with a crankshaft. JP2009-185786A discloses such a valve timing control apparatus that includes a sun gear, which is fixed to the driving-side rotatable body with a bolt, and a planetary gear, which is meshed with an internally toothed portion of the sun gear having internal teeth. The driven-side rotatable body is rotated relative to the driving-side rotatable body through planetary motion of the planet gear. In JP2009-185786A, the sun gear is press fitted to the driving-side rotatable body to limit misalignment of the sun gear relative to the driving-side rotatable body.

In JP2009-185786A, the driving-side rotatable body is press fitted to a radially inner side of each of press fitting projections of the sun gear, which project in the axial direction on a radially outer side of the internally toothed portion of the sun gear. For example, in a case where an axial position of a sprocket formed at an outer wall of the driving-side rotatable body is set to be closer to the sun gear, the fitting relationship between the driving-side rotatable body and the sun gear needs to be reversed. That is, it is required to press fit the sun gear to the radially inner side of the press-fitting projections that project from the driving-side rotatable body in the axial direction.

However, when the fitting relationship between the driving-side rotatable body and the sun gear is reversed in the above-described manner, the sun gear receives an axial compression force from the bolts and is thereby deformed to expand in the radial direction. At this time, radially outward deformation of the sun gear is interfered by the press-fitting projections of the driving-side rotatable body. Thus, the amount of deformation of the sun gear toward the radially inner side becomes larger than the amount of deformation of the sun gear toward the radially outer side. As a result, generations of friction and noise caused by the radially inward deformation of the internally toothed portion of the sun gear occur, and thereby there may possibly be deterioration in the performance and durability of the valve timing control apparatus.

SUMMARY

The present disclosure is made in view of the above disadvantages.

According to the present disclosure, there is provided a valve timing control apparatus that is placed in a rotation transmission path, which conducts rotation from a drive shaft of an internal combustion engine to a driven shaft. The valve timing control apparatus adjusts valve timing of a valve that is opened and closed by the driven shaft. The valve timing control apparatus includes a first rotatable body, a second rotatable body, a sun gear, a plurality of fixing members, a planetary gear, and a rotation transmission arrangement. The first rotatable body is rotatable synchronously with one of the drive shaft and the driven shaft. The second rotatable body is rotatable synchronously with another one of the drive shaft and the driven shaft. The sun gear includes an internally toothed portion, which is coaxial with the first rotatable body. The plurality of fixing members is placed on an outer side of the internally toothed portion in a radial direction and fixes the sun gear and the first rotatable body together. The planetary gear makes planetary motion while the planetary gear is meshed with the internally toothed portion. The rotation transmission arrangement changes a rotational phase of the second rotatable body relative to the first rotatable body by transmitting rotation of the planetary gear to the second rotatable body at a time when the planetary gear makes the planetary motion. The sun gear includes a plurality of throughholes, through which the plurality of fixing members is respectively received. The sun gear further includes a plurality of press-fitting parts, each of which is press-fitted to the first rotatable body at a corresponding location that is located between corresponding adjacent two of the plurality of fixing members in a circumferential direction. The sun gear also includes a plurality of open parts, each of which is placed at a corresponding location that overlaps with a corresponding one of the plurality of fixing members in the circumferential direction, while a corresponding one of a plurality of predetermined spaces is located adjacent to each of the plurality of open parts on an outer side of the open part in the radial direction.

BRIEF DESCRIPTION OF THE DRAWINGS

The drawings described herein are for illustration purposes only and are not intended to limit the scope of the present disclosure in any way.

DETAILED DESCRIPTION

Figure 1:
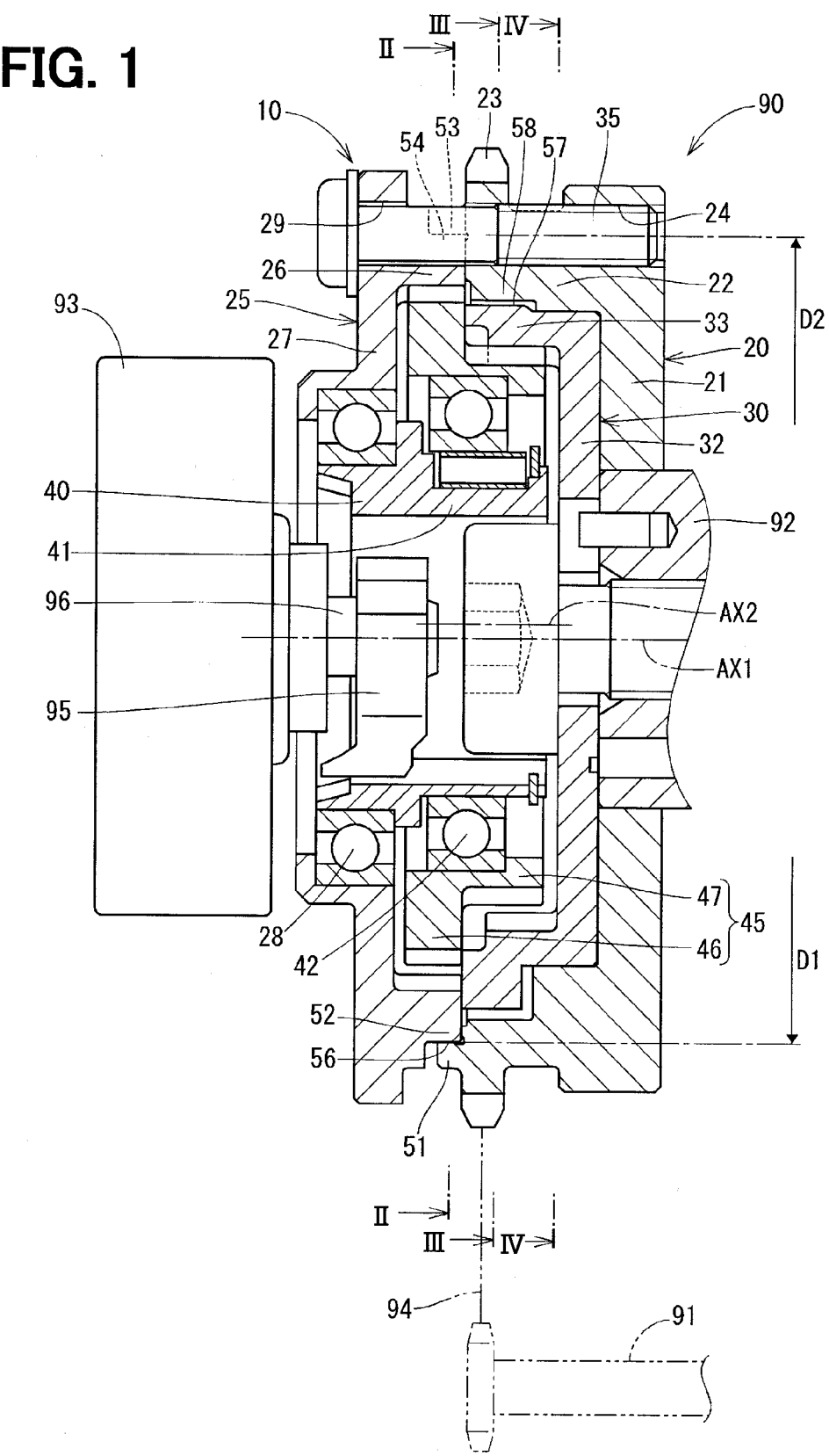
FIG. 1 is a cross sectional view for describing a valve timing control apparatus according to a first embodiment of the present disclosure.

Embodiment of the present disclosure will be described with reference to the accompanying drawings. In the following discussion of the embodiments, similar components will be indicated by the same reference numerals and will not be described redundantly for the sake of simplicity.

FIG. 1 shows a valve timing control apparatus according to an embodiment of the present disclosure. The valve timing control apparatus 10 adjusts valve timing of intake valves (not shown), which are opened and closed by a camshaft 92, by rotating the camshaft 92 relative to a crankshaft 91 of an internal combustion engine 90. The valve timing control apparatus 10 is placed in a rotation transmission path, which extends from the crankshaft 91 to the camshaft 92 (i.e., a rotation transmission path, which conducts rotation from the crankshaft 91 to the camshaft 92). The crankshaft 91 serves as a drive shaft of the present disclosure. The camshaft 92 serves as a driven shaft of the present disclosure. The intake valves serve as valves of the present disclosure.

First of all, an entire structure of the valve timing control apparatus 10 will be described with reference to FIGS. 1 to 4.

The valve timing control apparatus 10 is an electric valve timing control apparatus, which is driven by an electric motor 93. The valve timing control apparatus 10 includes a driving-side rotatable body 20, a sun gear (also referred to as an internal gear) 25, a driven-side rotatable body 30, bolts 35, an eccentric shaft 40, and a planetary rotatable body 45. The motor 93 is placed along an imaginary extension of the camshaft 92 (i.e., is placed along an axis of the camshaft 92) and is fixed to a chain cover (not shown).

The driving-side rotatable body 20 is configured into a form of a tubular body having a bottom. The driving-side rotatable body 20 includes a bottom portion 21, a tubular portion 22, and a sprocket 23. The bottom portion 21 is configured into a form of a circular disk and is fitted to the camshaft 92. The tubular portion 22 projects from the bottom portion 21 in the axial direction. The sprocket 23 projects outward from an end part of the tubular portion 22, which is opposite from the bottom portion 21 in the axial direction. The driving-side rotatable body 20 includes a plurality of threaded holes 24, each of which extends through the tubular portion 22 and the bottom portion 21 in the axial direction. The sprocket 23 is rotatably connected to the crankshaft 91 through a chain 94. The driving-side rotatable body 20 is rotatable synchronously with the crankshaft 91 and serves as a first rotatable body of the present disclosure.

The sun gear 25 is configured into a form of a tubular body having a bottom. The sun gear 25 includes a first internally toothed portion 26, which is configured into a form of a tubular body, and a bottom portion 27, which is configured into a form of a circular disk body. The first internally toothed portion 26 is coaxial with the driving-side rotatable body 20 and is placed on a side of the tubular portion 22, which is opposite from the bottom portion 21 in the axial direction. The first internally toothed portion 26 includes a plurality of internal teeth that are arranged one after another in a circumferential direction of the first internally toothed portion 26. The bottom portion 27 is placed on a side of the first internally toothed portion 26, which is opposite from the driving-side rotatable body 20 in the axial direction. A bearing 28 is placed on an inner side of the bottom portion 27 in a radial direction. The sun gear 25 includes a plurality of through-holes 29, each of which extends through the first internally toothed portion 26 and the bottom portion 27 in the axial direction. The first internally toothed portion 26 serves as an internally toothed portion of the present disclosure.

The driven-side rotatable body 30 is configured into a form of a tubular body having a bottom. The driven-side rotatable body 30 includes a bottom portion 32, which is configured into a form of a circular disk body, and a second internally toothed portion 33, which is configured into a form of a tubular body. The bottom portion 32 is fixed to an end part of the camshaft 92 with a bolt 31. The second internally toothed portion 33 projects from the bottom portion 32 in the axial direction and is coaxial with the driving-side rotatable body 20. The second internally toothed portion 33 includes a plurality of internal teeth that are arranged one after another in a circumferential direction of the second internally toothed portion 33. The driven-side rotatable body 30 is received in the tubular portion 22 of the driving-side rotatable body 20. The driven-side rotatable body 30 is rotatable synchronously with the camshaft 92 and serves as a second rotatable body of the present disclosure.

Each of the bolts 35 serves as a fixing member of the present disclosure. Each bolt 35 is inserted into a corresponding one of the through-holes 29 from a side of the sun gear 25, which is opposite from the driving-side rotatable body 20 in the axial direction, and each bolt 35 is threadably inserted into a corresponding one of the threaded holes 24. The bolts 35 are placed on an outer side of the first internally toothed portion 26 in the radial direction and fix the sun gear 25 and the driving-side rotatable body 20 together. In the present embodiment, the number of the bolts 35 is four, and the number of the through-holes 29 is four. Furthermore, the number of the threaded holes 24 is four. In the present embodiment, the bolts 35 are arranged one after another at equal intervals in the circumferential direction.

The eccentric shaft 40 is placed along an axis AX1 of the sun gear 25 and of the driving-side rotatable body 20. The eccentric shaft 40 is supported by the sun gear 25 through the bearing 28 such that the eccentric shaft 40 is rotatable about the axis AX1. An end part of the eccentric shaft 40, which is located on a side where the driving-side rotatable body 20 is placed, forms an eccentric portion 41 that is eccentric to the axis AX1. A bearing 42 is placed on an outer side of the eccentric portion 41 in the radial direction. The eccentric shaft 40 is connected to a motor shaft 96 of the motor 93 through a connecting member 95 in a manner that enables transmission of rotation of the motor shaft 96.

The planetary rotatable body 45 is configured into a form of a stepped body and includes a first planetary gear 46 and a second planetary gear 47. The first planetary gear 46 is meshed with the first internally toothed portion 26 (more specifically, the internal teeth of the first internally toothed portion 26). The second planetary gear 47 is meshed with the second internally toothed portion 33 (more specifically, the internal teeth of the second internally toothed portion 33). The planetary rotatable body 45 is placed along an eccentric axis AX2, which is an axis of the eccentric portion 41. The planetary rotatable body 45 is supported by the eccentric portion 41 through the bearing 42 in such a manner that the planetary rotatable body 45 makes a planetary motion. The planetary motion is a motion of rotating about the eccentric axis AX2 while revolving about the axis AX1. The number of the teeth of the first planetary gear 46 is smaller than the number of the teeth of the first internally toothed portion 26. The number of the teeth of the second planetary gear 47 is smaller than the number of the teeth of the second internally toothed portion 33. The first planetary gear 46 serves as a planetary gear of the present disclosure.

In the valve timing control apparatus 10, which is constructed in the above-described manner, in a case where the rotational phase of the camshaft 92 relative to the crankshaft 91 is on a retarding side of a target value, the eccentric shaft 40 is rotated by the motor 93 at a high speed relative to the driving-side rotatable body 20 and the sun gear 25. That is, the eccentric shaft 40 is rotated toward the advancing side relative to the driving-side rotatable body 20 and the sun gear 25. At this time, the rotation of the eccentric shaft 40 is transmitted to the camshaft 92 at the reduced rotational speed that is reduced by the planetary motion of the planetary rotatable body 45. In this way, the valve timing of the intake valve is advanced. The second planetary gear 47 and the second internally toothed portion 33 cooperate with each other to serve as a rotation transmission arrangement (a rotation transmission means) that transmits rotation of the first planetary gear 46 to the driven-side rotatable body 30 at the time when the first planetary gear 46 makes the planetary motion.

Furthermore, in a case where the rotational phase of the camshaft 92 relative to the crankshaft 91 is on an advancing side of the target value, the eccentric shaft 40 is rotated by the motor 93 at a low speed relative to the driving-side rotatable body 20 and the sun gear 25. That is, the eccentric shaft 40 is rotated toward the retarding side relative to the driving-side rotatable body 20 and the sun gear 25. At this time, the rotation of the eccentric shaft 40 is transmitted to the camshaft 92 at the reduced rotational speed that is reduced by the planetary motion of the planetary rotatable body 45. In this way, the valve timing of the intake valve is retarded.

Furthermore, in a case where the rotational phase of the camshaft 92 relative to the crankshaft 91 coincides with the target value, the eccentric shaft 40 is rotated by the motor 93 at an equal speed that is equal to the rotational speed of the driving-side rotatable body 20 and of the sun gear 25. At this time, the planetary rotatable body 45 is rotated integrally with the driving-side rotatable body 20 and the driven-side rotatable body 30. In this way, the valve timing of the intake valve is maintained.

Next, the characteristic structure of the valve timing control apparatus 10 will be described with reference to FIGS. 1 to 3.

Figure 2:
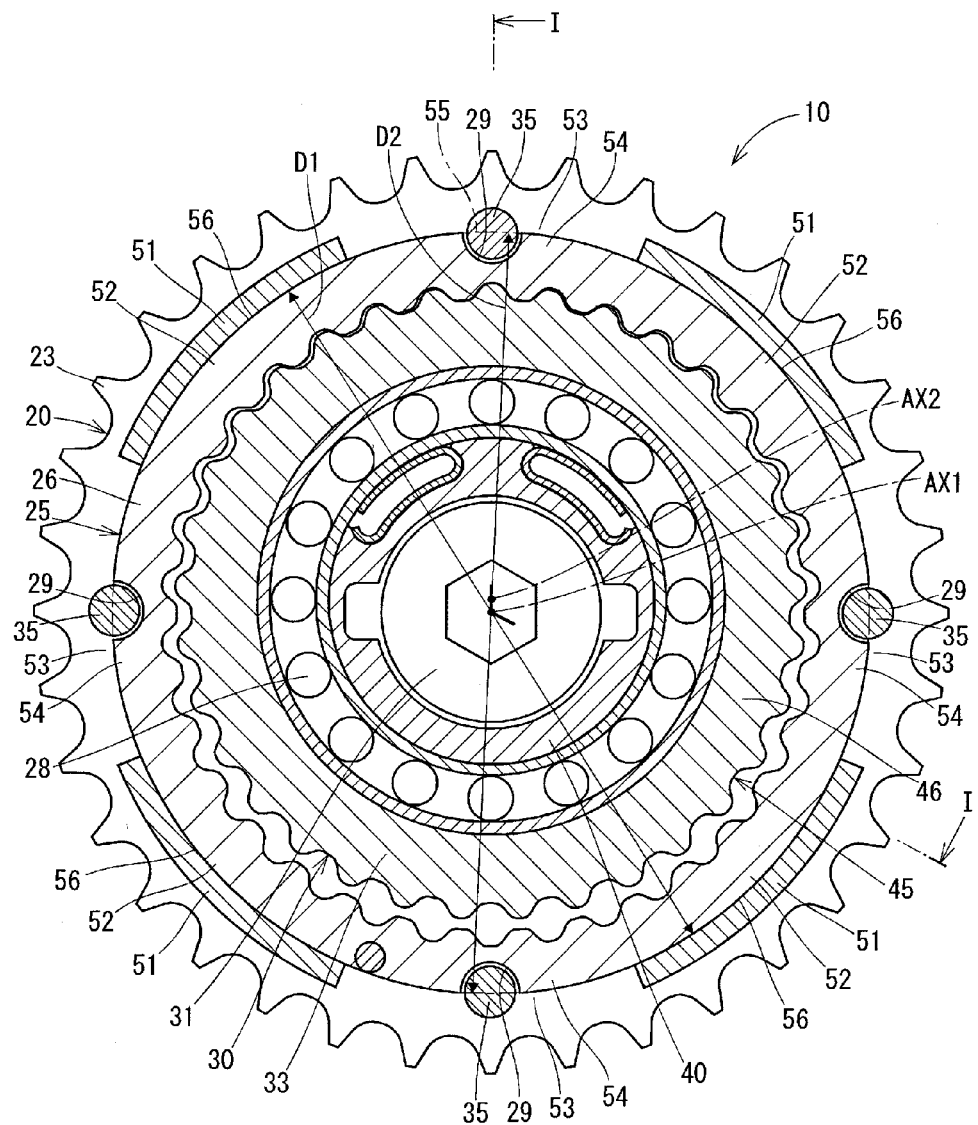
FIG. 2 is a cross-sectional view taken along line II-II in FIG. 1.

As shown in FIGS. 1 and 2, the tubular portion 22 of the driving-side rotatable body 20 includes a plurality of press-fitting projections 51, each of which projects toward the sun gear 25 in the axial direction at a corresponding circumferential location that is located between corresponding adjacent two (corresponding circumferentially adjacent two) of the bolts 35 in the circumferential direction. In the present embodiment, only one of the press-fitting projections 51 is placed between the corresponding adjacent two of the bolts 35 (i.e., the single press-fitting projection 51 is placed between the corresponding adjacent two of the bolts 35). The press-fitting projections 51 are arranged one after another at equal intervals in the circumferential direction.

The first internally toothed portion 26 of the sun gear 25 includes a plurality of press-fitting parts 52 and a plurality of open parts 54. Each of the press-fitting parts 52 is press-fitted to a corresponding one of the press-fitting projections 51 at a corresponding location that is located between corresponding adjacent two (corresponding circumferentially adjacent two) of the bolts 35 in the circumferential direction. Each of the open parts 54 is placed at a corresponding location, which overlaps with a corresponding one of the bolts 35 in the circumferential direction (a corresponding location that coincides with a location of the corresponding one of the bolts 35 in the circumferential direction), while a corresponding one of a plurality of predetermined spaces 53 is located adjacent to each open part 54 on an outer side of the open part 54 in the radial direction.

Each through-hole 29 opens radially outward at the corresponding location that corresponds to the corresponding one of the open parts 54. Furthermore, the through-holes 29 are placed along a pitch circle (also referred to as a bolt circle) 55 of the bolts 35, which is centered at the axis AX1. The pitch circle is a theoretical circle, on which the center points of the bolts 35 (and thereby the center points of the through holes 29) lie. An outer diameter D1 of the first internally toothed portion 26, i.e., an outer diameter D1, which is measured between a press-fitting surface 56 of one of the press-fitting parts 52 and a press-fitting surface 56 of a diametrically opposite one of the press-fitting parts 52 that is diametrically opposite from the one of the press-fitting parts 52 in a diametrical direction in the sun gear 25, is the same as a diameter D2 of the pitch circle 55.

Figure 3:
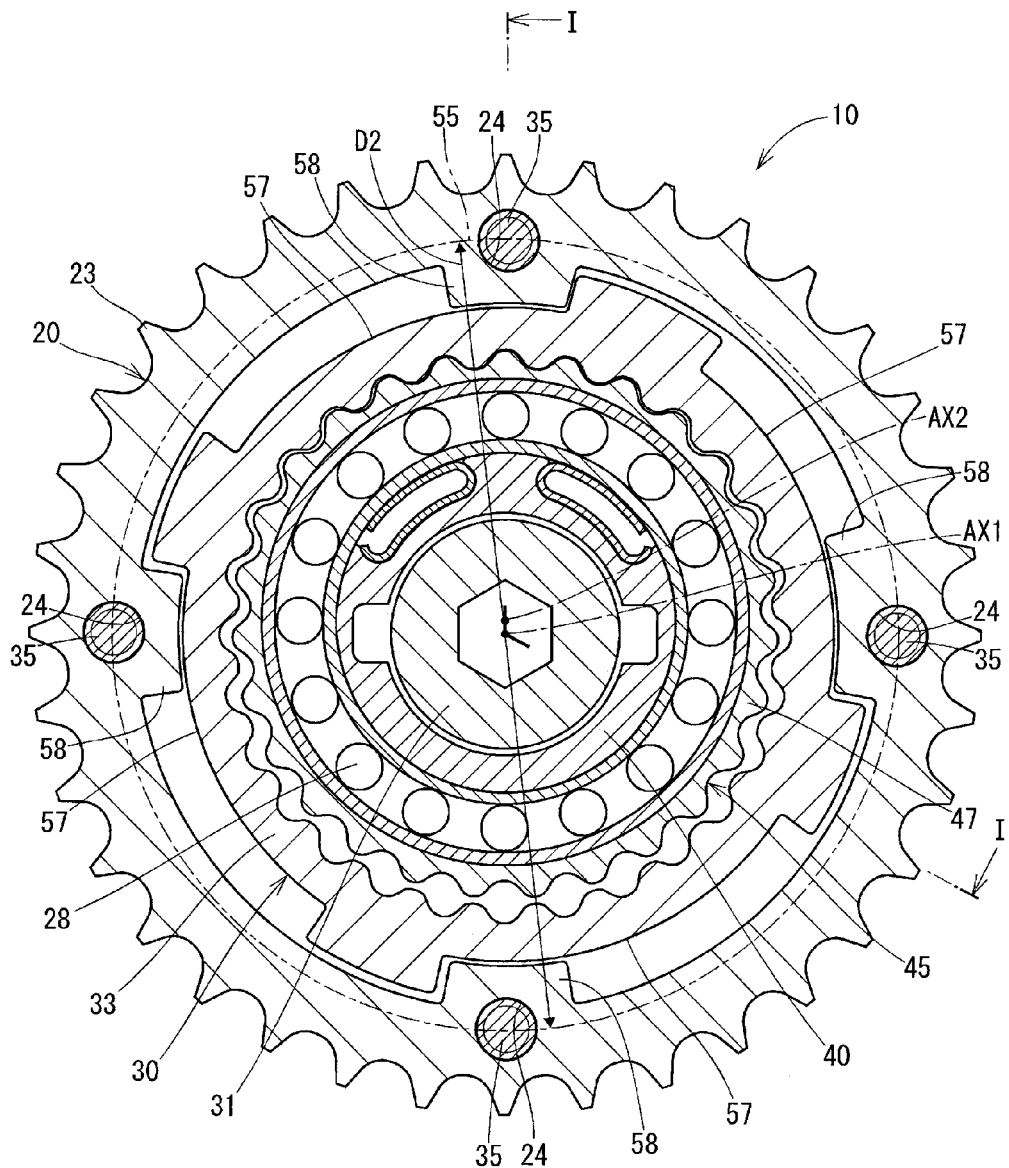
FIG. 3 is a cross-sectional view taken along line III-III in FIG. 1.
Figure 4:
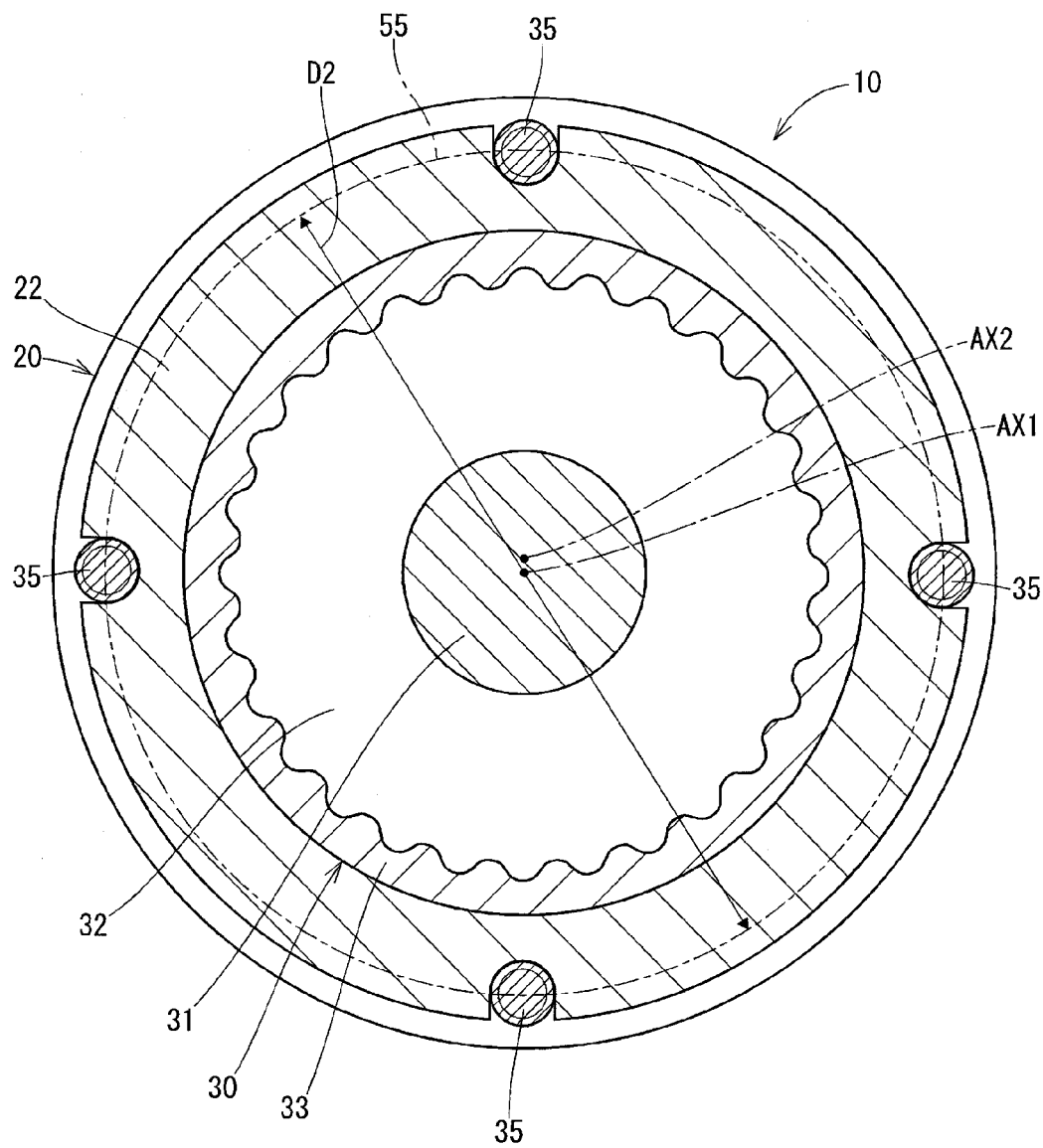
FIG. 4 is a cross sectional view taken along line IV-IV in FIG. 1.

As shown in FIG. 3, the second internally toothed portion 33 of the driven-side rotatable body 30 includes a plurality of recesses 57, each of which is inwardly recessed in the radial direction in an outer wall of the second internally toothed portion 33 of the driven-side rotatable body 30. The tubular portion 22 of the driving-side rotatable body 20 includes a plurality of stoppers 58, each of which inwardly projects in the radial direction and is received in a corresponding one of the recesses 57. Each the stoppers 58 is engageable with the corresponding one of the recesses 57 (more specifically, a corresponding circumferential end wall surface of the corresponding one of the recesses 57) to limit rotation of the driven-side rotatable body 30 relative to the driving-side rotatable body 20 within a predetermined angular range. In the present embodiment, the number of the recesses 57 is four, and the number of the stoppers 58 is four. Each of the threaded holes 24 is formed at a corresponding location, at which the threaded hole 24 overlaps with a corresponding one of the stoppers 58 in the circumferential direction (i.e., a corresponding location that coincides with a location of the corresponding one of the stoppers 58 in the circumferential direction).

Now, advantages of the present embodiment will be described.

As discussed above, in the present embodiment, the sun gear 25 includes the press-fitting parts 52 and the open parts 54. Each of the press-fitting parts 52 is press-fitted to the corresponding one of the press-fitting projections 51 of the driving-side rotatable body 20 at the corresponding location that is located between corresponding adjacent two of the bolts 35 in the circumferential direction. Each of the open parts 54 is placed at the corresponding location, which overlaps with the corresponding one of the bolts 35 in the circumferential direction, while the corresponding one of the predetermined spaces 53 is located adjacent to each open part 54 on the outer side of the open part 54 in the radial direction.

At the time of assembling, when the sun gear 25 receives the axial compression force from the bolts 35 and is deformed to expand in the radial direction, the deformation of the sun gear 25 mainly occurs around each bolt 35, i.e., occurs at each corresponding location of the first internally toothed portion 26 that overlaps with the corresponding bolt 35 in the circumferential direction (i.e., each corresponding location of the first internally toothed portion 26 that coincides with the location of the corresponding bolt 35 in the circumferential direction). In the present embodiment, the corresponding location of the first internally toothed portion 26, which overlaps with the corresponding bolt 35 in the circumferential direction, is the location of the open part 54, and the predetermined space 53 is placed on the outer side of the open part 54 in the radial direction. Therefore, the wall of the first internally toothed portion 26 of the sun gear 25 around the bolt 35 is deformed outward in the radial direction such that the wall of the first internally toothed portion 26 around the bolt 35 is relieved into the space 53. Therefore, the deformation of the wall of the first internally toothed portion 26 toward the radially inner side can be limited. As a result, the radially inward deformation of the first internally toothed portion 26 of the sun gear 25 can be limited, and thereby generation of the friction and the noise can be limited.

Furthermore, each press-fitting part 52, which is located between the corresponding adjacent two of the bolts 35 and is more resistant to the deformation in the sun gear 25, is press fitted to the driving-side rotatable body 20.

Therefore, according to the present embodiment, occurrence of misalignment of the axis of the sun gear 25 can be limited while limiting a deterioration in the performance and the durability of the valve timing control apparatus 10.

Furthermore, in the present embodiment, each through-hole 29 of the sun gear 25, through which the corresponding bolt 35 is received, outwardly opens in the radial direction at the corresponding location that corresponds to the open part 54.

Therefore, the wall of the first internally toothed portion 26 of the sun gear, which receives the axial compression force, can be further deformed toward the radially outer side.

Furthermore, in the present embodiment, the through-holes 29 are arranged along the pitch circle 55, which is centered at the axis AX1 of the sun gear 25. The outer diameter D1 of the first internally toothed portion 26, i.e., the outer diameter D1, which is measured between the press-fitting surface 56 of the one of the press-fitting parts 52 and the press-fitting surface 56 of the diametrically opposite one of the press-fitting parts 52 that is diametrically opposite from the one of the press-fitting parts 52 in the diametrical direction in the sun gear 25, is the same as the diameter D2 of the pitch circle 55.

In this way, each through-hole 29 can be radially outwardly opened at the corresponding location that corresponds to the corresponding open part 54.

Here, when a portion of the through-hole 29 radially outwardly opens, a rigidity of the housing, which is formed by the driving-side rotatable body 20 and the sun gear 25, may possibly be deteriorated.

In contrast, in the present embodiment, each threaded hole 24 is formed at the corresponding location, which overlaps with the corresponding stopper 58 in the circumferential direction (i.e., the corresponding location that coincides with the location of the corresponding stopper 58 in the circumferential direction).

In this way, a sufficient wall thickness of the housing (more specifically a sufficient wall thickness of the driving-side rotatable body 20) is ensured around each threaded hole 24 to limit the deterioration in the rigidity of the housing, so that a sufficient axial force of each bolt 35 can be ensured. Furthermore, the threaded holes 24 can be placed at the radially inner side, so that the size of the valve timing control apparatus 10 can be reduced in the radial direction.

OTHER EMBODIMENTS

In another embodiment of the present disclosure, the press-fitting projections of the driving-side rotatable body may be configured into a form of a tubular body that extends continuously all around the axis of the driving-side rotatable body in the circumferential direction. In such a case, a plurality of grooves is respectively formed at a plurality of corresponding locations, which correspond to the open parts of the sun gear, in an inner wall of this tubular body. In this way, the open parts are formed such that the corresponding one of the predetermined spaces is located adjacent to the corresponding one of the open parts on the outer side of the open part in the radial direction.

In another embodiment of the present disclosure, the outer diameter, which is measured between the press-fitting surface of the one of the press-fitting parts and the press-fitting surface of the diametrically opposite one of the press-fitting parts that is diametrically opposite from the one of the press-fitting parts in the diametrical direction in the sun gear, may be larger than the diameter of the pitch circle of the bolts or may be smaller than the diameter of the pitch circle of the bolts.

In another embodiment of the present disclosure, each of the through-holes of the sun gear may not open radially outward at the corresponding location that corresponds to the corresponding one of the open parts.

In another embodiment of the present disclosure, the first internally toothed portion and the bottom portion of the sun gear may be formed from separate members, respectively.

In another embodiment of the present disclosure, another type of fixing member, such as a rivet, may be provided in place of each of the bolts.

In another embodiment of the present disclosure, the valve timing control apparatus may be a valve timing control apparatus, which adjusts valve timing of exhaust valves of the internal combustion engine.

In another embodiment of the present disclosure, the valve timing control apparatus may be arranged coaxially with the crankshaft.

Additional advantages and modifications will readily occur to those skilled in the art. The present disclosure in its broader terms is therefore not limited to the specific details, representative apparatus, and illustrative examples shown and described.

What is claimed is:

1. A valve timing control apparatus that is placed in a rotation transmission path, which conducts rotation from a drive shaft of an internal combustion engine to a driven shaft, wherein the valve timing control apparatus adjusts valve timing of a valve that is opened and closed by the driven shaft, the valve timing control apparatus comprising:
   a first rotatable body that is rotatable synchronously with one of the drive shaft and the driven shaft;
   a second rotatable body that is rotatable synchronously with another one of the drive shaft and the driven shaft;
   a sun gear that includes an internally toothed portion, which is coaxial with the first rotatable body;
   a plurality of fixing members that are placed on an outer side of the internally toothed portion in a radial direction and fix the sun gear and the first rotatable body together;
   a planetary gear that makes planetary motion while the planetary gear is meshed with the internally toothed portion; and
   a rotation transmission arrangement that changes a rotational phase of the second rotatable body relative to the first rotatable body by transmitting rotation of the planetary gear to the second rotatable body at a time when the planetary gear makes the planetary motion, wherein:
   the sun gear includes:
      a plurality of through-holes, through which the plurality of fixing members is respectively received;
      a plurality of press-fitting parts, each of which is press-fitted to the first rotatable body at a corresponding location that is located between corresponding adjacent two of the plurality of fixing members in a circumferential direction; and
      a plurality of open parts, each of which is placed at a corresponding location that overlaps with a corresponding one of the plurality of fixing members in the circumferential direction, while a corresponding one of a plurality of predetermined spaces is located adjacent to each of the plurality of open parts on an outer side of the open part in the radial direction.

2. The valve timing control apparatus according to claim 1, wherein each of the plurality of through-holes outwardly opens in the radial direction at a corresponding location, which corresponds to a corresponding one of the plurality of open parts.

3. The valve timing control apparatus according to claim 1, wherein:
   each of the plurality of through-holes is placed along a pitch circle of the plurality of fixing members, which is centered at an axis of the sun gear; and an outer diameter, which is measured between a press-fitting surface of one of the plurality of press-fitting parts and a press-fitting surface of a diametrically opposite one of the plurality of press-fitting parts that is diametrically opposite from the one of the plurality of press-fitting parts in a diametrical direction in the sun gear, is the same as a diameter of the pitch circle.

4. The valve timing control apparatus according to claim 1, wherein:
- each of the plurality of fixing members is a bolt that is threadably inserted into the first rotatable body through the sun gear;
- the second rotatable body includes a plurality of recesses, each of which is inwardly recessed in the radial direction in an outer wall of the second rotatable body;
- the first rotatable body includes a tubular portion, which receives the second rotatable body; and
- the tubular portion includes:
  - a plurality of stoppers, each of which inwardly projects in the radial direction and is received in a corresponding one of the plurality of recesses, wherein each of the plurality of stoppers is engageable with the corresponding one of the plurality of recesses in the circumferential direction to limit rotation of the second rotatable body relative to the first rotatable body; and
  - a plurality of threaded holes, each of which is formed at a corresponding location that overlaps with a corresponding one of the plurality of stoppers in the circumferential direction, wherein each of the plurality of fixing members is threadably inserted into a corresponding one of the plurality of threaded holes.

* * * * *